United States Patent [19]

Wichelhaus et al.

[11] Patent Number: 4,737,306

[45] Date of Patent: Apr. 12, 1988

[54] LAYERED SILICATES OF LIMITED SWELLING POWER, A PROCESS FOR THEIR PRODUCTION AND THEIR USE IN DETERGENTS AND CLEANING PREPARATIONS

[75] Inventors: Winfried Wichelhaus, Mettmann; Wolfgang von Rybinski, Duesseldorf; Horst Upadek, Ratingen, all of Fed. Rep. of Germany

[73] Assignee: Kenkel Kommanditgesellschaft auf Aktien, Duesseldorf, Fed. Rep. of Germany

[21] Appl. No.: 883,256

[22] Filed: Jul. 8, 1986

[30] Foreign Application Priority Data

Jul. 24, 1985 [DE] Fed. Rep. of Germany ....... 3526405

[51] Int. Cl.$^4$ .................. C01B 33/22; C01B 33/26; C01B 33/32; C11D 3/12
[52] U.S. Cl. ............................ 252/95; 252/99; 252/131; 252/140; 252/174.25; 423/328; 423/329; 423/331
[58] Field of Search .......... 423/328 M, 329, 331; 252/131, 174.25, 135, 140, 95, 91

[56] References Cited

U.S. PATENT DOCUMENTS

| | | | |
|---|---|---|---|
| 3,666,407 | 5/1972 | Orlemann | 423/331 |
| 3,671,190 | 6/1972 | Neumann | 423/331 |
| 3,855,147 | 12/1974 | Granquist | 252/317 |
| 3,954,943 | 5/1976 | Neumann | 423/331 |
| 3,959,444 | 5/1976 | Yokoi | 423/328 |
| 4,040,974 | 8/1977 | Wright | 252/316 |
| 4,049,780 | 9/1977 | Neumann | 423/331 |
| 4,054,537 | 10/1977 | Wright | 252/317 |
| 4,148,603 | 4/1979 | Schwuger | 8/137 |
| 4,438,012 | 3/1984 | Kuhling | 252/131 |
| 4,542,002 | 9/1985 | Corma | 423/331 |
| 4,597,886 | 7/1986 | Goedhart | 252/95 |
| 4,632,768 | 12/1986 | Atkinson | 252/8.8 |

FOREIGN PATENT DOCUMENTS

| | | |
|---|---|---|
| 1667502 | 6/1971 | Fed. Rep. of Germany . |
| 2334899 | 1/1974 | Fed. Rep. of Germany . |
| 2412837 | 10/1974 | Fed. Rep. of Germany . |
| 3149131A | 6/1983 | Fed. Rep. of Germany ... 423/328 M |

OTHER PUBLICATIONS

Chemical Abstracts, vol. 36, Cols. 5073–5074, 1942.
Laponite XLG, RD, XLS, RDS—(no date).
Laponite in Household Products—Jan. 1968.
Neumann, "The Formation of Stable Sols from Laponite, a Synthetic Hectorite-Like Clay (Clay Minerals (1970)) 8,389.
W. I. Grandquist & S. S. Pollack, "Clays and Clay Minerals" *Natl. Sci. Natl. Res. Council Pub. 8* (1960) pp. 150–169.
R. K. Iler, "The Chemistry of Silica," pp. 158–160, J. Wiley & Sons, New York 1979.
Grimshaw, "The Chemistry & Physics of Clays", pp. 264–265, E. Benn Ltd., London (1971).
Kirk-Othmer, 1979, vol. 6, p. 198.
G. W. Brindley & G. Brown, "Crystal Structures of Clay Minerals and their X-Ray Identification, Mineral Soc., pp. 305, et seq., London 1980.
H. Strese and U. Hoffmann, Z. *Anorg. Allg. Chem.*, 247 (1941) pp. 65–95.

*Primary Examiner*—Dennis Albrecht
*Attorney, Agent, or Firm*—Ernest G. Szoke; Henry E. Millson, Jr.; Real J. Grandmaison

[57] ABSTRACT

The present invention provides synthetic, finely divided water-insoluble layered silicates having a smectite-like crystal phase, with increased contents of bound alkali and silicate and a distinctly reduced swelling power in aqueous suspension relative to pure layered silicates of this type. The synthetic layered silicate of this invention has the following oxide summation formula $$MgO \cdot aM_2O \cdot bAl_2O_3 \cdot cSiO_2 \cdot nH_2O$$

wherein M is selected from the group consisting of sodium and a mixture of sodium and lithium said mixture having a molar ratio of sodium to lithium of at least about 2,
  n represents the number of water molecules bound in the crystal phase, and
  a, b, c and n each represent a number having a value within the following ranges:
    a is from about 0.05 to about 0.4
    b is from 0 to about 0.3
    c is from about 1.2 to about 2.0, and
    n is from about 0.3 to about 3.0.

39 Claims, No Drawings

LAYERED SILICATES OF LIMITED SWELLING POWER, A PROCESS FOR THEIR PRODUCTION AND THEIR USE IN DETERGENTS AND CLEANING PREPARATIONS

BACKGROUND OF THE INVENTION

1. Field of the Invention

This invention relates to new synthetic, finely divided, water-in-soluble layered silicates having a smectite-like crystal phase. The layered silicates are distinguished from known natural and synthetic smectite-based layered silicates, in particular montmorillonite, hectorite and saponite for example, by a distinctly reduced swelling power in aqueous suspension. The invention also relates to processes for producing these smectite-like layered silicates and to their use as environmentally neutral constituents of detergents and cleaning preparations, more especially to their use as a builder constituent of low-phosphate and phosphate-free laundry detergents containing synthetic surfactants.

2. Description of Related Art

The replacement of phosphate builders, particularly sodium tripolyphosphate (STP), in detergents and cleaning preparations containing synthetic surfactants is described, for example, in DE-AS No. 24 12 837. In practice, zeolite NaA has proven to be an entirely satisfactory replacement for STP, particularly for laundry detergents. In this connection, it also was proposed to use synthetic, crystalline, non-swelling aluminosilicates of the zeolite type in admixture with water-insoluble, swellable magnesium and/or aluminum silicates of the bentonite, montmorillonate, hectorite or saponite type as detergent builders. Thus, U.S. Pat. No. 4,438,012 describes pumpable aqueous suspensions of improved stability, for example, of zeolite A, which contain as their constituent highly swellable smectite-based layered silicates of the type mentioned above.

Numerous proposals both in the literature and in practice are concerned with the partial or complete replacement of the STP builder in laundry detergents by builder systems based on synthetic, crystalline, non-swelling zeolites, particularly based on zeolite NaA. The STP builder is undesirable for ecological reasons, although as recently as a decade ago, it was still being used as virtually the only detergent builder. Successful use of the synthetic zeolite has included so-called co-builders in small quantities together with the insoluble crystalline zeolite as the principal builder constituent. These co-builders generally are soluble components capable of complexing alkaline earth metal ions from stains on the laundry. Hence, both primary and secondary detergency are distinctly improved over detergent mixtures free from such co-builders. Primary detergency relates to the degree of whitening obtained by washing soiled test materials one or more times under standard conditions. Secondary detergency relates inter alia to the degree of redeposition and incrustation on the textile fibers after repeated washing under standard conditions, for example, after 25 or after 50 washes with a particular detergent.

Today, the use of, for example, nitrilotriacetic acid salts (NTA) and/or polyphosphonic acid salts, such as corresponding salts of hydroxyethane diphosphonic acid (HEDP), as a co-builder constituent is standard practice for STP-free detergents based on synthetic surfactants and zeolite A as the main builder constituent. Although these co-builders are used in only small quantities in the detergents by virtue of their high effectiveness (generally only a few weight percent), it would now appear desirable—in the light of more stringent water pollution control requirements, to replace completely or at least partially even these small amounts of co-builders in favor of other components of comparable effect. Co-builders of this latter type known both in practice and in the literature are, for example, organic macromolecular polymer compounds containing carboxyl and/or hydroxyl groups of the type described, for example, in U.S. Pat. No. 4,438,012.

The use of highly swellable, finely divided layered silicates or clays in detergents has been known for many decades. Natural and/or synthetic crystalline smectites having a highly swellable layered structure have been proposed as a constituent of laundry detergents in various connections. Natural bentonite for example has been repeatedly proposed as a detergent or detergent substitute. Today, corresponding synthetic or semi-synthetic, water-insoluble, finely divided layered silicates of smectite structure and, more particularly, corresponding hectorites, saponites and montmorillonites are well-known commercial products for numerous applications. A crucial factor here is always the high swellability which relates to the ability of this class of layered silicates to incorporate water and/or organic, cationic compounds into the crystal lattice with widening of the layer intervals.

The use of materials such as these in connection with laundry detergents relates in particular to two principles. It is known that swellable layered silicates and, in particular, montmorillonite, hectorite and saponite in the sodium form are deposited in thin layers on textile fibers and, hence, affect the softness and feel of the washed fabrics. With this in mind, attempts have been made to combine the washing and softening of fabrics into a single operation, and this recently has been addressed again, for example in DE-PS No. 23 34 899.

According to more recent proposals, the known use of strongly swelling clays having a smectite-like layered structure, particularly bentonite, in conjunction with finely crystalline synthetic zeolites as builders in laundry detergents based on synthetic surfactants is based on another consideration. The crystalline alumosilicates are intended to disintegrate very quickly in the wash water to form a suspension of ultrafine primary particles. However, if the detergents and/or builder components have been produced under conditions which otherwise would lead to agglomeration of the fine zeolite particles into non-readily disintegrating agglomerates, by also incorporating the highly swellable smectite clays in the zeolite material by thorough mixing, the desired disintegrating effect is nonetheless produced in the wash liquor and rapid disintegration of the insoluble fractions of the detergent mixture into a very finely divided form occurs.

An object of the present invention is to provide environmentally neutral constituents for builder systems based on insoluble, very finely divided, synthetic, crystalline zeolite materials and, more particularly, on zeolite NaA for the complete or partial replacement of STP. The present builder system renders the use of co-builders (particularly NTA and/or polyphosphonic acid salts) largely superfluous while, at the same time, ensuring good primary and/or secondary detergency of the detergent mixtures in line with today's stringent requirements.

DESCRIPTION OF THE INVENTION

The present invention is based on the surprising observation that certain layered silicate compounds having a smectite-like lattice structure which, however, is not identical with the structure of known, layered silicates of the smectite type, are particularly suitable for achieving the object of the invention. Surprisingly, it is these layered silicates having a smectite-like crystal structure but having a distinctly reduced swelling power in water which enable the objects of the invention to be achieved.

In a first embodiment, therefore, the present invention relates to a synthetic, finely divided, water-insoluble layered silicate having a smectite-like crystal phase, with increased contents of bound alkali and silicate and having a distinctly reduced swelling power in aqueous suspension relative to pure layered silicates of this type. The synthetic layered silicate of this invention has the following oxide summation formula $MgO.aM_2O.bAl_2O_3.cSiO_2.nH_2O$ wherein M is selected from the group consisting of sodium and a mixture of sodium and lithium said mixture having a molar ratio of sodium to lithium of at least about 2, n represents the number of water molecules bound in the crystal phase, and a, b, c and n each represent a number having a value within the following ranges:
a is from about 0.05 to about 0.4
b is from 0 to about 0.3
c is from about 1.2 to about 2.0
n is from about 0.3 to about 3.0

The water "bound" in the crystal phase normally is considered to be that water which remains after prolonged drying of the layered silicate at about 100° C. This bound or inter-layer water is lost mostly between about 100° to 250° C. but some remains to about 300° C. At about 300° C. slow loss of constitutional water (OH) begins and rapid loss thereof occurs at about 500° C. and is complete at about 750° C.

In further embodiments described below, the present invention relates to a process for producing the new, synthetic layered silicates having a smectite-like crystal structure, but having increased bound alkali and silicate and a clearly reduced swelling power in aqueous suspension. Further embodiments of the present invention relate to the use of these new, non-swelling or only slightly swelling layered silicates as a constituent in builder compositions for low-phosphate and phosphate-free detergents and cleaning preparations based on synthetic surfactants and cleaning co-builders in conjunction with finely divided crystalline zeolites and, more especially, zeolite NaA. These detergents and cleaning preparations will be referred to as STP-free laundry detergents.

The new water-insoluble layered silicates or clays of the present invention having a limited swelling power are described in greater detail hereinafter. The new synthetic, water-insoluble, very finely divided clay minerals may be regarded as layered silicates which have the structural features of mica-like layered silicates, but which have an imperfection in regard to the attachment of adjacent layers. A structural formula of the type usually employed to express the composition of clay minerals can only be obtained using additional assumptions for the layered silicates of the present invention.

The structure and reflective positions of smectites are described in detail in the literature, for example, see G. W. Brindley and G. Brown, "Crystal Structures of Clay Minerals and their X-Ray Identification", Mineral Soc., p. 305, et seq., London, 1980. According to this literature reference, smectites have four characteristic reflections which lie in the following ranges of the lattice intervals:
9.6–15.5 Å (according to H$_2$O content)
4.45–4.66 Å
2.55–2.60 Å
1.49–1.54 Å

The X-ray diffractions patterns of the layered silicates of the present invention show that they are structurally related to the smectites. For example, the maxima of the reflections of the layered silicates according to the invention lie at d (Å) 13.4; 4.5; 2.57 and 1.535.

However, the chemical composition of the new layered silicate compounds shows more Na$_2$O and SiO$_2$ than the associated smectites: saponite and hectorite. Thus, it appears that, in addition to the layered arrangement typical of mica-like compounds of this type, the layered silicates of the present invention also contain units of incorporated sodium silicates. This suggests that the silicates in question are sodium polysilicates, particularly those having a layered structure, i.e., so-called sodium phyllosilicates. Compounds of this type are described in the literature, cf. R. K. Iler "The Chemistry of Silica", pp. 158–160, J. Wiley & Sons, New York, 1979.

Although sodium polysilicates such as these having a layered structure occur in nature, they may also be synthetically produced. The synthesis conditions for the sodium polysilicates and smectites are similar. In terms of structure and synthesis, the crystallization of the layered silicates of the present invention presumably may be interpreted as the formation of a mixed crystal in which sodium polysilicate is incorporated in smectite. The X-ray diffraction patterns show that their incorporation is not regular, but instead leads to imperfections in crystallites. Accordingly, crystallographic characterization by lattice constants which describe an elementary cell is not possible.

The composition of the synthetic layered silicates of the present invention may be expressed by the following, previously cited oxide summation formula $MgO.aM_2O.bAl_2O_3.cSiO_2.nH_2O$ in which the parameters a, b, c and n represent a number in the broadest ranges cited above and M is sodium or a mixture of sodium and lithium with a predominant sodium content. In one preferred embodiment, the parameters a, b and c each represent a number within the following ranges:
a is from about 0.15 to about 0.30,
b is from 0 to about 0.10, and
c is from about 1.3 to about 1.5

In another preferred embodiment, the ratio of a to b is equal to or greater than about 3 and, more preferably, equal to or greater than about 4. A synthetic layered silicate which has proved to be particularly useful is, for example, one of distinctly reduced swelling power which—disregarding its bound water—is characterized by the oxide summation formula MgO.0.25Na$_2$O.0.05Al $_2O_3 \cdot 1.42 SiO_2$. X-ray structural analysis of this material shows saponite-like fractions. However, as can be appreciated from the following, the product of the present invention differs distinctly in its composition from saponite, which has the following oxide formula:

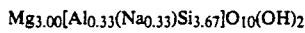

(Kirk-Othmer 1979, Vol. 6, p. 198). Based on the oxide formula cited above, the values for a, b and c for saponite may be calculated from the relative molar numbers. The values of a, b and c for saponite are compared in the following Table with the values of a, b and c for the cited layered silicate of the present invention:

| Variable | Saponite | Layered Silicate of the Invention |
|---|---|---|
| a | 0.055 | 0.25 |
| b | 0.055 | 0.05 |
| c | 1.22 | 1.42 |

On the basis of the selected chemical composition, saponite- and hectorite-like phases count as synthetic smectites in the context of the present invention. Accordingly, it should be possible to describe the mixed crystal system by the following structural formula:

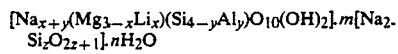

where the first part of the formula characterizes the smectite and the second part of the formula represents the sodium polysilicate. These two components form a phase in which the smectite determines the structure.

The variables in the previous formula may assume the following numerical values:
  x is from 0 to about 0.3, preferably from 0 to about 0.1
  y is from 0 to about 0.5, preferably from 0 to about 0.4
  x+y is from about 0.1 to about 0.5, preferably from about 0.2 to about 0.4
  z is from about 1 to about 22, preferably from about 1 to about 14
  m is from about 0.1 to about 0.5, preferably from about 0.1 to about 0.3
  n is from 0 to about 8, preferably from about 2 to about 6.

As noted above, the molar ratio of sodium to lithium should be at least about 2, and preferably equal to or greater than about 3.

The clearly differing composition of the synthetic layered silicates of the present invention relative to pure smectites and the associated imperfection in the crystal structure lead to changes in a number of properties typical of layered silicates per se, particularly in regard to swellability and, hence, gel-forming properties, but also in regard to ion exchange capacity.

The layered silicates of the present invention are distinguished by a comparatively high alkali metal oxide content. However, this high alkali metal oxide content is not caused by free alkali metal in the clean-washed material, since it cannot be reduced by further washing with water. Also only some of the sodium ions can be exchanged for other cations (for procedure for determining ion exchange capacity, see for example the methods described by Grimshaw in "The Chemistry and Physics of Clays" pp. 264–265, E. Benn Ltd., London (1971)). In the synthetic layered silicates of the present invention, which are particularly suitable for use in detergents and cleaning preparations, sometimes less than half of all the sodium ions present can be exchanged for ammonium ions. Thus, the ion exchange capacity of the layered silicates of the present invention typically is below that of natural saponites and other smectites, although it still can be considered appreciable.

The changes observed in gel-forming properties are more meaningful for characterizing the layered silicates of the present invention. As a result of the mixed crystal structure, a different property spectrum is produced in relation to known natural and synthetic smectites (e.g., bentonite, hectorite, saponite). The layered silicates of the present invention swell only very slightly, if at all. Accordingly, they are unable for example to incorporate long-chain surfactants in their crystal structure (for example residues of cationc or nonionic surfactants), nor do they form gels like the pure smectites mentioned above. These functions are blocked by the incorporation of the sodium polysilicates into the structure. By contrast, the ion exchange ability of the product of the present invnetion for small cations (for example $Mg^{2+}$, $Ca^{2+}$, $NH_4^+$), if it exists at all, remains largely intact.

To determine the gel-forming properties of a layered silicate product, a sedimentation test was developed which, through preliminary preparative measures, substantially precludes influences other than those related to structure on gel formation. Such undesirable influences are either excessive electrolyte contents (i.e., foreign salts which have not been removed) or inadequate activation with Na-ions.

The gel-forming properties of a given material may be assessed by means of the sedimentation test described below. This specific procedure significantly eliminates the sources of error described above.

SEDIMENTATION TEST (a) 90 ml of tapwater (16°dH=German hardness) are poured into a beaker and 10 g of layered silicate are introduced in small portions with vigorous stirring, followed by stirring for 15 minutes at room temperature.

The suspension then is poured into a measuring cylinder and left standing undisturbed. During the standing time, the measuring cylinder is covered with a film. After 20 hours, the quotient of the sediment volume $V_s$ and the total volume V is determined. The quotient ($V_s/V$) will be referred to as the swelling power of the particular layered silicate tested.

Apparatus:

| | |
|---|---|
| Beaker: | 250 ml, 70 mm diameter |
| Stirrer: | three-blade propeller stirrer, 50 mm diameter, rotational speed 700–1000 $min^{-1}$ |
| Measuring Cylinder: | 100 ml DIN glass measuring cylinder |

(b) If the sedimentation quotient $V_s/V$ is below about 0.8, the layered silicate is pretreated as follows before retesting in accordance with step (a);

20 g of the layered silicate are dispersed for 15 minutes with stirring in 500 ml of deionized water. The suspension then is filtered through a paper filter and the filter residue is washed twice with 50 ml of deionized water. The layered silicate from the filter residue is dried for 2 hours at 125° C., triturated and then tested again as described in (a).

(c) If the sedimentation quotient $V_s/V$ is still below 0.8 after the pretreatment according to step (b), a second pretreatment is carried out as follows:

15 g of the layered silicate are dispersed in 500 ml of deionized water and, after addition of 5 g of soda, the suspension is intensively stirred for 30 minutes. The layered silicate is recovered and then is treated as described above in step (b).

Assessment after 20 hours:

| Measured $V_s/V$ | Condition |
| --- | --- |
| 1.0 | stable gel |
| 1.0 to 0.8 | unstable gel |
| 0.6 to 0.8 | sedimentation |
| <0.6 | heavy sedimentation |

$V_s$ = sediment volume (containing layered silicate)
$V$ = total volume

Layered silicates according to the present invention are characterized inter alia in that they have a limited swelling power in water (16°dH at room temperature), determined as the quotient of the sediment volume ($V_s$) over the total volume (V) after pretreatment with excess soda solution and careful washing. In particular, the layered silicates have a $V_s/V$ quotient or swelling power of less than about 0.6 and more especially less than about 0.4. Accordingly, for products of the present invention, determination of the quotient $V_s/V$ is most quickly carried out in accordance with steps (a) to (c) described above, but in the opposite sequence, without determination of the corresponding intermediate volume quotients. It is only using the final determination according to step (a), after suspension of 10 g of pretreated layered silicate in 90 ml of water (16°dH at room temperature) and after standing for 20 hours, that the sedimentation volume $V_s$ is determined and the quotient $V_s/V$ calculated.

Values for the particular $V_s/V$ quotient or swelling power determined on natural and synthetic or modified natural smectites are compared in the following Table with corresponding values for products of the present invention.

| Sedimentation behavior of layered silicate suspensions | | |
| --- | --- | --- |
| Layered silicate | Pretreatment | $V_s/V$ (after 20 hr) |
| Natural smectites: | | |
| Active bentonite B[1] | — | 1.0 |
| Ca-bentonite[1] | — | 0.42 |
| Ca-bentonite[1] | c | 1.0 |
| Dis-Thix-Extra[2] | — | 1.0 |
| Bentonite A[1] | b | 1.0 |
| Synthetic smectites: | | |
| Laponite RD[3] | — | 1.0 |
| Hectorite, containing Na$_2$SO$_4$ | — | 0.72 |
| Hectorite | b | 1.0 |
| Product No. 5 of the invention, containing Na$_2$SO$_4$ | — | 0.20 |
| Product No. 8 of the invention | b | 0.25 |
| Product No. 5 of the invention[4] | — | 0.23 |
| Product No. 5 of the invention[4] | — | 0.27 |
| Product No. 18 of the invention[4] | — | 0.39 |
| Product No. 19 of the invention[4] | — | 0.23 |

[1]a product of Erbslöh, Geisenheim, Rhine
[2]a product of Schwegmann, Bonn
[3]a product of Laporte, Ind. England
[4]washed free from electrolyte It is not only those layered silicates corresponding to the above definition, which have been freed from foreign salts and excess alkali that are considered within the scope of the present invention. On the contrary, it may be advantageous in certain embodiments of the invention for the synthetic, mixed-crystalline, finely divided materials to contain excess alkali which is not bound in the crystal structure and/or for the synthetic materials to be thoroughly mixed with, in particular, water-soluble salts. For example, the excess alkali may be sodium hydroxide. Typically, the water-soluble salts optionally present in admixture with the layered silicate originate and are thus present from the process used to produce the layered silicate. The salts in question may be, in particular, alkali metal sulfates and/or alkali metal carbonates. Advantages afforded by the use of mixtures such as these are subsequently described.

PREPARATION OF THE LAYERED SILICATES OF THE PRESENT INVENTION

The synthesis of layered silicates, particularly hectorites, has often been described in the literature (H. Strese and U. Hoffmann, Z. Anorg. Allg. Chem, 247 (1941) pps. 65–95; W. I. Grandquist and S. S. Pollack in "Clays and Clay Minerals" Natl. Sci. Natl. Res. Council Publ. 8 (1960) pps. 150–169; and DE-AS No. 1 667 502). To produce the synthetic, finely divide, water-insoluble layered silicates of the present invention with their smectite-like crystal phase, sodium silicate solutions are subjected to a hydrothermal treatment together with oxides, hydroxides and/or water-soluble salts of magnesium and also aluminum and/or lithium in the molar ratios of the mixed-crystalline layered silicate to be synthesized either in aqueous solution or in aqueous suspension. The treatment is preferably carried out in the presence of an excess of an alkali, particularly sodium hydroxide and/or soda.

Before the hydrothermal treatment, a premix of the individual components is prepared with vigorous stirring either in a separate mixing vessel or directly in an autoclave. It has proved advantageous initially to introduce an aqueous magnesium salt solution, for example a magnesium sulfate, chloride or hydroxide solution, and then to stir in a waterglass solution in which the molar ratio of SiO$_2$ to Na$_2$O is from about 2.0 to about 3.7:1. Sodium hydroxide and/or soda (sodium carbonate) and also sodium aluminate and/or a lithium salt solution are added last. The lithium and aluminium salts may also be added in solid form, for example as lithium hydroxide, lithium carbonate and hydragillite. A finely divided suspension is formed, the viscosity of which increases with increasing solids content.

A hydrothermal reaction of the reaction mixture is carried out with stirring in an autoclave at a temperature of about 150° to 250° C. and preferably at about 170° to 200° C. under an equilibrium vapor pressure corresponding to the reaction temperature. The reaction time is between about 1 and 20 hours and preferably between about 2 and 8 hours. Reaction temperatures of from about 170° to 190° C. with reaction times of from about 4 to 6 hours are particularly preferred for the hydrothermal process.

Aside from the crystallization conditions, the gel formation, swellability and cation exchange capacity of the layered silicates of the present invention are largely determined by the initial reaction mixture. Non-gel-forming layered silicates may be prepared with $SiO_2$/MgO molar ratios of from about 1.2 to 2.0. With increasing $SiO_2$/MgO molar ratios, the $Na_2O$ content must be increased to ensure good crystallization. Layered silicates prepared with a molar ratio of $SiO_2$ to MgO of from about 1.4 to 1.7 in the reaction mixture and a $Na_2O$ to MgO molar ratio of from about 1.2 to 1.4 are preferred.

The optimal $Na_2O$/MgO molar ratio is determined by varying the sodium hydroxide added and by monitoring the pH. After the reaction, the pH of the mother liquor should be at least about 12 and preferably between about 12.5 and 13.0. Accordingly, crystallization always should be carried out in the presence of an excess of $Na_2O$. With $SiO_2$/MgO ratios of greater than about 1.4 and $Na_2O$/MgO ratios of greater than about 1.3, a small proportion of silicate remains dissolved in the mother liquor. This proportion may amount to between about 3 and 6% of the silicate used, thus the layered silicates formed will have an $SiO_2$/MgO molar ratio reduced by this proportion compared with the starting reaction mixture.

The cation exchange capacity of the layered silicate depends upon the aluminum oxide content and the lithium oxide content. The greater these contents are in the layered silicate, the greater its ion exchange capacity. The $Al_2O_3$/MgO molar ratio in the reaction mixture should not exceed about 0.3. This limitation is necessary in order to suppress the formation of sodalite and zeolites, particularly zeolite P, although the presence of small amounts of these crystal phases is not detrimental to the use of the layered silicates of the present invention in detergents.

The following procedures can be used for recovering the layered silicates of the present invention from the reaction mixture:

(a) The mixture of the reaction products of solids and mother liquor is dried without separation. In addition to the layered silicate, the end product then contains primarily sodium sulfate, optionally soda, free $Na_2O$ and relatively small amounts of soluble sodium silicate and, optionally, small amounts of $Li_2O$. Sodalite and/or zeolites may also be present depending upon the initial reaction mixture and reaction conditions.

(b) After part of the mother liquor has been separated, for example by filtration or centrifugation, the residue is dried. The product again contains the constituents mentioned above in (a), although the proportion of water-soluble constituents is smaller.

(c) After separation of the mother liquor, for example by filtration or centrifuging, the residue is thoroughly washed and then dried, leaving behind the layered silicate which may still contain sodalite or zeolites.

(d) The mixture of reaction products is stored as a suspension before further processing.

Layered silicates of the present invention, for example, recovered by procedures (a), (b) or (d) are particularly suitable for use as a raw material in detergents and cleaning preparations, particularly laundry detergents, because the excess alkali metal present eliminates or reduces the need for other alkaline components in the detergent formulation and the sodium sulfate content has a beneficial effect on the dispersibility of the layered silicate in the wash liquor. Additionally, the mother liquor separated during preparation (b) may be introduced into a laundry detergent as the washing alkali. Where the layered silicate of the present invention recovered by procedure (d) is used in a detergent, the mixture preferably has the highest possible solids content. Based on the water-free formula:

$MgO.aM_2O.bAl_2O_3.cSiO_2$ in which M is sodium or a mixture of sodium and lithium as defined above and a, b and c each represent a number within the ranges cited above, suitable mixtures contain from about 50 to 100 moles of $H_2O$. Smaller water contents necessitate intensive stirring of the reaction mixture during the hydrothermal treatment because the viscosity of the mixture initially undergoes a marked increase. After crystallization, the viscosity falls—even for relatively high initial solids contents—to such an extent that further processing of the reaction mixture poses little problem.

The layered silicates of the present invention with their smectite-like phase are characterized by analysis of the product recovered after separation using procedure (c).

USE OF THE LAYERED SILICATES ACCORDING TO THE INVENTION

Surprisingly, the new mixed-crystalline layered silicates of the present invention particularly improve both the primary and secondary detergency of STP-low and STP-free detergents. These layered silicates are particularly suitable as mixture constituents for systems which use zeolites, particularly zeolite NaA, as the main builder constituent.

The non-swelling layered silicates of the present invention may partly or completely replace to co-builder components NTA and/or HEDP, which as mentioned above are commonly used in STP-low and STP-free detergents having zeolite builders. The resulting detergents produce high lightening (whitening) values after only a single wash and extremely low incrustation values after repeated washing.

Surprisingly, the primary and secondary detergency of detergents and cleaning preparations employing the layered silicates of the present invention, particulary laundry detergents, which are essentially free from zeolites and which have a reduced phosphate content, for example of from about 20 to 25% by weight based on the total weight of the detergent, are also significantly improved.

As noted, the layered silicates of this invention may be used in various ways:

The isolated reaction products of the hydrothermal reaction, washed free of water-soluble constituents, may be used as such. However, such labor-intensive cleaning of the product is not necessary and, in certain embodiments of the invention, is not even desirable. Thus, it is possible to use the filter cake of the hydrothermal reaction product obtained simply by filtration or centrifuging as co-builder components in the detergent mixture (procedure (b)). Finally, it is also possible to introduce the entire hydrothermal reaction product, i.e., the reaction products together with the mother liquor, into the detergent (procedure (d)).

Variations such as these provide for important advantages both in regard to production of the detergents and also in regard to the behaviour of the layered silicates of the present invention in the laundering process.

Thus, excess alkali used in producing the layered silicates may be introduced directly into the detergent as the washing alkali component, so that there is no need for washing alkali to be added separately. At the same time, this excess of alkali accelerates crystallization of the layered silicates in the course of their hydrothermal production.

If the insoluble layered silicates are formed in admixture with other reaction salts during their production, it can be advantageous to use the admixture as a "mixed reaction product". Accompanying reaction salts may be, in particular, sulfates and/or carbonates which accumulate, by virtue of the choice of the starting components, as secondary reaction products during production of the layered silicates of the present invention. Thus, sodium sulfate and/or sodium carbonate for example may be present in intimate admixture with the insoluble layered silicates. In one important embodiment of the invention, it is advisable to use this mixture directly. Ultimately, this considerably facilitates dispersion of the insoluble reaction components in the wash liquor.

The layered silicates of the present invention with their distinctly reduced swellability can be included in detergents and cleaning preparations, particularly laundry detergents, in a quantity of up to about 30% by weight preferably from about 5 to 20% by weight and more preferably from about 10 to 15% by weight, based on the total weight of the detergent. In addition to the layered silicate, detergents and cleaning preparations typically will include inter alia, detergent builders, surfactants (synthetic), foam inhibitors, redeposition agents, bleaches, optical brighteners, water-soluble organic solvents and enzymes.

Detergent builder constituents, which may be present together with the layered silicates of the present invention in detergents and cleaning preparations, are described in detail below.

Suitable organic and inorganic builders are salts showing a mildly acidic, neutral or alkaline reaction, particularly alkali salts, which are capable of precipitating or complexing calcium ions. Of the inorganic salts, the water-soluble alkali metaphosphates or alkali polyphosphates, particularly pentasodium triphosphate, are of particular importance in addition to the alkali ortho- and pyrophosphates. These phosphates may be completely or partly replaced by organic complexing agents for calcium ions, including compounds of the aminopolycarboxylic acid type, such as for example nitrilotriacetic acid (NTA), ethylene diamine tetraacetic acid, diethylene triamino pentaacetic acid and higher homologs. Suitable phosphorus-containing organic complexing agents are the water-soluble salts of alkane polyphosphonic acids, amino- and hydroxyalkane polyphosphonic acids and phosphonopolycarboxylic acids, such as for example methane diphosphonic acid, dimethylaminomethane-1,1-diphosphonic acid, aminotrimethylene triphosphonic acid, 1-hydroxyethane-1,1-diphosphonic acid, 1-phosphonoethane-1,2-dicarboxylic acid, 2-phosphonobutane-1,2,4-tricarboxylic acid.

Among the organic builder, nitrogen- and phosphorus-free polycarboxylic acids which form complex salts with calcium ions, including polymers containing carboxyl groups, are of particular importance. Suitable builders of this type are, for example, citric acid, tartaric acid, benzene hexacarboxylic acid and tetrahydrofuran tetracarboxylic acid. Other suitable organic builders are polycarboxylic acids containing ether groups, such as 2,2'-oxydisuccinic acid and also polyfunctional alcohols or hydrocarboxylic acids completely or partly etherified with glycolic acid, for example bis-carboxymethylethylene glycol, carboxymethyloxysuccinic acid, carboxymethyltartronic acid and carboxymethylated or oxidized polysaccharides.

Other suitable organic builders are polymeric carboxylic acids having a molecular weight of from 350 to about 1,500,000 in the form of water-soluble salts. Particularly preferred polymeric polycarboxylates have a molecular weight in the range of form about 500 to 175,000 and more especially in the range of from about 10,00 to 100,000. Compounds such as these include, for example, polyacrylic acid, poly-α-hydroxyacrylic acid, polymaleic acid and also copolymers of the corresponding monomeric carboxylic acids with one another or with ethylenically unsaturated compounds, such as vinylmethylether. The water-soluble salts of polyglyoxylic acid are also suitable.

Suitable water-insoluble inorganic builders are the finely divided, synthetic sodium alumosilicates containing bound water of the zeolite A type which are described in detail as phosphate substituents for detergents and cleaning preparations in DE-OS No. 24 12 837.

The cation-exchanging sodium alumosilicates are used in the customary hydrated, finely crystalline form, i.e., they do not contain any particles larger than about 30 µm and preferably at least 80% of the particles are smaller than 10 µm. Their calcium binding power as determined in accordance with DE-OS No. 24 12 837 is in the range of from 100 to 200 mg CaO/g (See also U.S. Pat. No. 4,148,603—col. 18, ln. 28–41). Zeolite NaA is particularly suitable, although mixtures of zeolite NaA and NaX may also be used.

Suitable inorganic, non-complexing salts are the alkali metal salts— also known as "washing alkalis"—of the bicarbonates, carbonates, borates, sulfates and silicates. Of the alkali silicates, sodium silicates in which the ratio of $Na_2O$ to $SiO_2$ is from about 1:1 to 1:3.5 are particularly preferred.

Other builders, which are generally used in liquid preparations by virtue of their hydrotropic properties, are the salts of non-capillary-active $C_2$–$C_9$ sulfonic acids, carboxylic acids and sulfocarboxylic acids, for example the alkali salts of alkane, benzene, toluene, xylene or cumene sulfonic acids, sulfobenzoic acids, sulfophthalic acid, sulfoacetic acid, sulfosuccinic acid and also the salts of acetic acid or lactic acid. Acetamide and ureas are also suitable solution promoters.

Surfactants, which are present as another important component in detergents and cleaning preparations, contain at least one hydrophobic organic residue and a water-solubilizing anionic, zwitter-ionic or nonionic group in the molecule. The hydrophobic residue is generally an aliphatic hydrocarbon radical containing from 8 to 26 carbon atoms, preferably from 10 to 22 carbon atoms and more preferably from 12 to 18 carbon atoms or an alkylaromatic radical containing from 6 to 18 carbon atoms in the alkyl moiety and more preferably from 8 to 16 aliphatic carbon atoms.

Suitable anionic surfactants are, for example, soaps of natural or synthetic fatty acids, preferably saturated fatty acids, and possibly even soaps of resinic or naphthenic acids. Suitable synthetic anionic surfactants are those of the sulfonate type, the sulfate type and the synthetic carboxylate type.

Suitable surfactants of the sulfonate type are alkylbenzene sulfonates ($C_9$–$C_{15}$ alkyl), olefin sulfonates, i.e., mixtures of alkene and hydroxyalkane sulfonates and also disulfonates of the type obtained, for example, by sulfonation with gaseous sulfur trioxide of $C_{12}$–$C_{18}$ monoolefins containing a terminal or internal double bond and subsequent alkaline or acidic hydrolysis of the sulfonation products. Other suitable surfactants of the sulfonate type are the alkane sulfonates obtainable from $C_{12}$–$C_{18}$ alkanes by sulfochlorination or by sulfoxidation and subsequent hydrolysis or neutralization or by addition of bisulfites onto olefins and also esters of $\alpha$-sulfofatty acids, for example the $\alpha$-sulfonated methyl or ethylesters of hydrogenated coconut oil, palm kernel oil or tallow fatty acids.

Suitable surfactants of the sulfate type are the sulfuric acid monoesters of primary alcohols of natural and synthetic origin, i.e., of fatty alcohols, such as for example coconut oil fatty alcohols, tallow fatty alcohols, oleyl alcohol, lauryl, myristyl, palmityl or stearyl alcohol, or $C_{10}$–$C_{20}$ oxoalcohols, and secondary alcohols having the same chain length. Other suitable surfactants of the sulfate type are the sulfuric acid monoesters of aliphatic primary alcohols ethoxylated with from 1 to 6 moles of ethylene oxide and ethoxylated secondary alcohols or alkylphenols. Sulfated fatty acid alcohol amides and sulfated fatty acid monoglycerides are also suitable.

Other suitable anionic surfactants are the fatty acid esters or fatty acid amides of hydroxy- or amino-carboxylic acids or sulfonic acids, such as for example fatty acid sarcosides, glycolates, lactates, taurides or isethionates.

The anionic surfactants may be present in the form of their sodium, potassium and ammonium salts and also in the form of soluble salts of organic bases, such as mono-, di- or triethanolamine.

Suitable nonionic surfactants are adducts of from 1 to 40 moles and preferably from 2 to 20 moles of ethylene oxide with 1 mole of a compound containing from 10 to 20 carbon atoms selected from the group comprising alcohols, alkylphenols, fatty acids, fatty amines, fatty acid amides or alkane sulfonamides. Of particular importance are the adducts of from 8 to 20 moles of ethylene oxide with primary alcohols, for example with coconut oil or tallow fatty alcohols, with oleyl alcohol, with oxoalcohols, or with secondary alcohols containing from 8 to 18 and preferably from 12 to 18 carbon atoms and also with mono- or dialkylphenols containing from 6 to 14 carbon atoms in the alkyl groups. In addition to these water-soluble nonionic surfactants, however, water-insoluble or substantially water-insoluble polyglycolethers containing from 2 to 7 ethylene glycolether groups in the molecule are also of interest, particularly when they are used in conjunction with water-soluble nonionic or anionic surfactants.

Other suitable nonionic surfactants are the water-soluble adducts, containing from 20 to 250 ethylene glycolether groups and from 10 to 100 propylene glycolether groups, of ethylene oxide with polypropylene glycol, alkylene diamine polypropylene glycol and with alkylpolypropylene glycols containing from 1 to 10 carbon atoms in the alkyl chain, in which the polypropylene glycol chain acts as a hydrophobic residue. Other suitable nonionic surfactants are those of the amine oxide or sulfoxide type, for example the compounds N-cocos-alkyl-N,N-dimethylamine oxide, N-hexadecyl-N,N-bis-(2,3-dihydroxypropyl)-amine oxide, and N-tallowalkyl-N,N-dihydroxyethylamine oxide.

The zwitter-ionic surfactants are preferably derivatives of aliphatic quaternary ammonium compounds in which one the aliphatic groups consist of a $C_8$–$C_{18}$ group and another group contains an anionic, water-solubilizing carboxy, sulfo or sulfato group. Typical representatives of surface-active betaines such as these are, for example, 3-(N-hexadecyl-N,N-dimethylammonio)-propane sulfonate; 3-(N-tallowalkyl-N,N-dimethylammonio)-2-hydroxypropane sulfonate; 3-(N-hexadecyl-N,N-bis-(2-hydroxyethyl)-ammonio)-2-hydroxypropylsulfate; 3-(N-cocos-alkyl-N,N-bis-(2,3-dihydroxypropyl)-ammonio)-propane sulfonate; N-tetradecyl-N,N-dimethylammonioacetate; N-hexadecyl-N,N-bis-(2,3-dihydroxypropyl)-ammonioacetate.

The foaming power of the detergents may be increased or reduced by combining suitable types of surfactants. A reduction may also be obtained by additions of non-surfactant-like organic compounds. A reduced foaming power, which is desirable where the detergents are used in automatic washing machines, is frequently obtained by combining various types of surfactants, for example, sulfates and/or sulfonates with non-ionic surfactants and/or with soaps. In the case of soaps, foam supression increases with the degree of saturation and the number of carbon atoms in the fatty acid residue; accordingly, soaps of saturated $C_{20}$–$C_{24}$ fatty acids are particularly suitable as foam inhibitors.

The non-surfactant-like foam inhibitors are generally water-insoluble compounds mostly containing aliphatic moieties of $C_8$–$C_{22}$. Such inhibitors are, for example, N-alkylaminotriazines, i.e., reaction products of 1 mole of cyanuric chloride with 2 to 3 moles of a mono or dialkylamine essentially containing from 8 to 18 carbon atoms in the alkyl group. Other suitable non-surfactant-like foam inhibitors are propoxylated and/or butoxylated aminotriazines, for example, the reaction products of 1 mole of melamine with from 5 to 10 moles of propylene oxide and, in addition, from 10 to 50 moles of butylene oxide, and also aliphatic $C_{18}$–$C_{40}$ ketones, such as for example stearone, fatty ketones of hardened train oil fatty acid or tallow fatty acid, as well as paraffins and halogenated paraffins melting below 100° C. and silicone oil emulsions based on polymeric organosilicon compounds.

The detergents and cleaning preparations may contain as further components soil suspending agents which keep the soil detached from the fibers and suspended in the liquor and, in doing so, prevent redeposition. Suitable soil suspending agents are water-soluble, generally organic colloids such as, for example, the water-soluble salts of polymeric carboxylic acids, glue, gelatin, salts of ether carboxylic acids or ether sulfonic acids of starch or cellulose or salts of acidic sulfuric acid esters of cellulose or starch. Water-soluble polyamides containing acidic groups are also suitable for this purpose. It is also possible to use soluble starch preparations and other starch products than those mentioned above, such as for example degraded starch, aldehyde starches, etc. Polyvinylpyrrolidone may also be used.

Among the compounds which yield $H_2O_2$ in water and which act as bleaches, sodium perborate tetrahydrate ($NaBO_2.H_2O_2.3H_2O$) and the monohydrate ($NaBO_2.H_2O_2$) are particularly important. However, it is also possible to use other $H_2O_2$-yielding borates, for example, the perborax $Na_2B_4O_7.4H_2O_2$. These compounds may be completely or partly replaced by other active oxygen donors, particularly peroxyhydrates, such as peroxycarbonates ($Na_2CO_3.1.5H_2O_2$), peroxypyrophosphates, citrate perhydrates, urea-$H_2O_2$ or melamine-$H_2O_2$ compounds, and by $H_2O_2$ yielding peracidic salts, such as for example caroates ($KHSO_5$), perbenzoates or peroxyphthalates.

It is advisable to incorporate standard water-soluble and/or water-insoluble stabilizers for the peroxy compounds together with the peroxy compounds in quantities of from 0.25 to 10% by weight (based on the weight of the detergent). Suitable water-insoluble stabilizers, which preferably make up from 0.5 to 8% by weight, based on the detergent formulation as a whole, are the magnesium silicates which are generally obtained by precipitation from aqueous solutions. Suitable water-soluble stabilizers which are preferably present together with water-insoluble stabilizers are organic heavy metal complexing agents, more especially the aminopolycarboxylic acids and polyphosphonic acids described above.

In order to obtain a satisfactory bleaching effect where washing is carried out at temperatures below about 80° C. and more especially at a temperature in the range of from about 40° to 60° C., activator-containing bleaching components are preferably incorporated in the preparations.

Suitable activators for peroxy compounds yielding $H_2O_2$ in water are certain N-acyl or O-acyl compounds which form organic peracids with $H_2O_2$, particularly acetyl, propionyl or benzoyl compounds, and also carbonic acid or pyrocarbonic acid esters. Suitable compounds are inter alia N-diacylated and N,N-tetraacylated amines, such as for example N,N,N'N'-tetraacetylmethylene diamine or ethylene diamine, N,N-diacetylaniline and N,N-diacetyl-p-toluidine or 1,3-diacylated hydantoins, alkyl-N-sulfonylcarbonamides, for example, N-methyl-N-mesylacetamide, N-methyl-N-mesylbenzamide, N-methyl-N-mesyl-p-nitrobenzamide and N-methyl-N-mesyl-p-methoxybenzamide, N-acylated cyclic hydrazides, acylated triazoles or urazoles, such as for example monoacetyl maleic acid hydrazide, O-N,N-trisubstituted hydroxylamines, such as for example O-benzoyl-N,N-succinylhydroxylamine, O-acetyl-N,N-succinylhydroxylamine, O-p-methoxybenzoyl-N,N-succinylhydroxylamine, O-p-nitrobenzoyl-N,N-succinylhydroxylamine and O-N,N-triacetylhydroxylamine, N,N'-diacylsulfurylamides, such as for example N,N'-dimethyl-N,N'-diacetylsulfurylamide and N,N'-diethyl-N,N'-dipropionylsulfurylamide, triacylcyanurates, for example triacetyl or tribenzoyl cyanurate, carboxylic acid anhydrides, for example benzoic acid anhydride, m-chlorobenzoic acid anhydride, phthalic acid anhydride, 4-chlorophthalic acid anhydride, sugar esters, such as for example glucose pentaacetate, 1,3-diacyl-4,5-diacyloxyimidazolidines, for example the compounds 1,3-diformyl-4,5-diacetoxyimidazolidine, 1,3-diacetyl-4,5-diacetoxyimidazolidine, 1,3-diacetyl-4,5-dipropionyloxyimidazoilidine, acylated glycolurils, such as for example tetrapropionylglycoluril or diacetyldibenzoylglycoluril, diacylated 2,5-diketopiperazines, such as for example, 1,4-diacetyl-2,5-diketopiperazine, 1,4-dipropionyl-2,5-diketopiperazine, 1,4-dipropionyl-3,6--dimethyl-2,5-diketopiperazine, acetylation and benzoylation products of propylene diurea and 2,2-dimethylpropylene diurea (2,4,6,8-tetraazabicyclo-(3,3,1)-nonane-3,7-dione or its 9,9-dimethyl derivative), sodium salts of p-(ethoxycarbonyloxy)-benzoic acid and p-(propoxycarbonyloxy)-benzene sulfonic acid.

As optical brighteners for cotton, the detergents may contain in particular deriviatives of diaminostilbene disulfonic acid or alkali metal salts thereof. Suitable brighteners for cotton are, for example, salts of 4,4'-bis-(2-anilino-4-morpholino-1,3,5-triazin-6-yl-amino)-stilbene-2,2'-disulfonic acid or compounds of similar structure which, instead of the morpholino group, contain a diethanolamino group, a methylamino group or a 2-methoxyethylamino group. Siutable brighteners for polyamide fibers are those of the 1,3-diaryl-2-pyrazoline type, for example, the compound 1-(p-sulfamoylphenyl)-3-(p-chlorophenyl)-2-pyarzoline and compounds of similar structure which, instead of the sulfamoyl group, contain for example the methoxycarbonyl, 2-methoxyethoxycarbonyl, the acetylamino or the vinylsulfonyl group. Other suitable polyamide brighteners are substituted aminocoumarins, for example 4-methyl-7-dimethylamino or 4-methyl-7-diethylaminocoumarin. Other suitable polyamide brighteners are the compounds 1-(2-benzimidazolyl)-2-(1-hydroxyethyl-2-benzimidazolyl)ethylene and 1-ethyl-3-phenyl-7-diethylaminocarbostyril. Suitable brighteners for polyester and polyamide fibers are the compounds 2,5-di-(2-benzoxazolyl-thiophene, 2-(2-benzoxazolyl)-naphtho-[2,3,-b]-thiophene and 1,2-di-(5-methyl-2-benzoxazolyl)-ethylene. Brighteners of the substituted 4,4'-distyryldiphenyl type, for example, the compound 4,4'-bis-(4-chloro-3-sulfostyryl)-diphenyl, may also be present. Mixtures of the brighteners mentioned above may also be used.

Suitable water-soluble organic solvents are lower alcohols, ether alcohols, gylcols or ketones containing from 1 to 6 carbon atoms, such as for example methanol, ethanol, propanol, isopropyl alcohol, ethylene glycol, propylene glycol, diethylene glycol, methylglycol, ethylglycol, butylglycol or acetone and methylethylketone.

The cmposition of fully formulated detergents and cleaning preparations, particularly laundry detergents, containing layered silicates according to the invention which are active at temperatures of from about 30° to 100° C. can be roughly based on the following general formulation guidelines:

approximately 5 to 30% by weight anionic and/or nonionic and/or zwitter-ionic surfactants,
approximately 0 to 60% by weight alumosilicates,
approximately 0 to 30% by weight phosphates,
approximately 5 to 30% by weight layered silicates of the present invention;
approximately 0 to 5% by weight other complexing agents for calcium,
approximately 0 to 50% by weight of builders not capable of complexing, and
approximately 0 to 50% by weight bleaches and other additives generally present in small quantities in laundry detergents.

Detergents and cleaning preparations, particularly laundry detergents, containing layered silicates according to the invention are manufactured by standard processes, for example by spray drying, spray cooling or granulation.

Although certain embodiments of the invention have been selected for description in the examples hereinafter, it will be appreciated by those skilled in the art that these examples are merely illustrative of, but do not in any way limit, the scope of the present invention which is defined in the appended claims.

In the following examples, percentages are percentages by weight, unless otherwise indicated.

EXAMPLE 1

616 g of magnesium sulfate heptahydrate were dissolved in 2 liters of deionized water and the resulting solution was reacted under vigorous stirring with 755 g of a sodium silicate solution containing 27 g of $SiO_2$ and 8 g of $Na_2O$ per 100 g. A finely divided suspension was formed. A solution of (i) 404 g of a 50% solution of sodium hydroxide, (ii) 1.5 liters of deionized water and (iii) 20.2 g of hydrargillite containing 63% by weight $Al_2O_3$ was added to this suspension with continued stirring.

The suspension then was heated for 20 minutes to 190° C. in a stirrer-equipped autoclave and stirred at that temperature for 4 hours. After cooling to 100° C., the autoclave was emptied and the layered silicate formed was filtered from the mother liquor. The filter cake was washed with deionized water until no sulfate could be detected in the wash water. The filter cake then was dried at about 100° C. in a recirculating air drying chamber.

Analysis of the product (designated product No. 1) revealed the following composition (in % by weight): MgO: 22.8%, $Na_2O$: 5.7%, $Al_2O_3$: 3.2%, $SiO_2$: 46.8% $H_2O$: 21.2%

The X-ray diffraction pattern of the layered silicate shows broad reflections with maxima at d (13.4 Å; 4.5 Å; 2.57 Å and 1.535 Å).

EXAMPLE 2

The synthesis procedure described in Example 1 was repeated in Example 2, wherein layered silicate Product Nos. 2–4 were produced according to the present invention. The reaction temperature was again 190° C. and the reaction time 4 hours. The molar ratios in the reaction mixtures are shown in Table 1 (Product No. 1 from Example 1 also is reported). The layered silicate Product Nos. 2–4 formed during the reaction were processed in the same way as Product No. 1 in Example 1 and, after drying, were examined to determine their crystal phases which are set forth in Table 1 below.

TABLE 1

| Example No. | Layered Silicate Product No. | Molar Ratio in the Reaction Mixture | | | | | Crystal Phases |
|---|---|---|---|---|---|---|---|
| | | MgO | $Na_2O$ | $Al_2O_3$ | $SiO_2$ | $H_2O$ | |
| 1 | 1 | 1.0 | 1.40 | 0.05 | 1.35 | 100 | layered silicate |
| 2 | 2 | 1.0 | 1.35 | — | 1.35 | 100 | layered silicate (with little crystallinity) |
| | 3 | 1.0 | 1.15 | 0.15 | 1.70 | 100 | layered silicate and very little sodalite |
| | 4 | 1.0 | 1.30 | 0.30 | 2.00 | 100 | layered silicate and a little zeolite P |

EXAMPLE 3

Further layered silicate Product Nos. 5–10 were produced in the same way as Product No. 1 in Example 1. In Example 3, the reaction temperature was 180° C., and the reaction time was varied as shown in Table 2. Also higher solids concentrations were used in the reaction mixture. In the preparation of Product No. 10, one-third of the water was replaced by a corresponding quantity of mother liquor recovered from the reaction mixture containing Product No. 9.

In the synthesis of each of Product Nos. 5–10, after separating the mother liquor from the reaction mixture, a portion of the filter cake containing $Na_2SO_4$ was dried without washing while another portion was washed with water to wash out the sulfate and then dried. In all these samples, the crystalline phase was found by radiographic examination to consist of a layered silicate having structural features very similar to those of mica-like layered silicates.

Analysis of product No. 8 after washing and drying revealed the following composition:
MgO: 22.8%, $Na_2O$: 8.5%, $Al_2O_3$: 2.8%, $SiO_2$: 48.2%

TABLE 2

| Layered Silicate Product No. | Molar Ratio in the Reaction Mixture | | | | | Reaction time t(hr) | Molar Ratio in the Sulfate-containing, Dried Filter Cake | | | | | | Moles of $Na_2O$ in the Sulfate-free, Dried Filter Cake |
|---|---|---|---|---|---|---|---|---|---|---|---|---|---|
| | MgO | $Na_2O$ | $Al_2O_3$ | $SiO_2$ | $H_2O$ | | MgO | $Na_2O$ | $Al_2O_3$ | $SiO_2$ | $H_2O$ | $SO_3$ | |
| 5 | 1.0 | 1.4 | 0.05 | 1.5 | 50 | 4 | 1.0 | 0.71 | 0.048 | 1.44 | 1.95 | 0.39 | 0.32 |
| 6 | 1.0 | 1.4 | 0.15 | 1.5 | 50 | 4 | 1.0 | 0.80 | 0.140 | 1.44 | 1.86 | 0.38 | 0.42 |
| 7 | 1.0 | 1.4 | 0.05 | 1.35 | 50 | 4 | 1.0 | 0.67 | 0.050 | 1.28 | 1.29 | 0.37 | 0.30 |
| 8 | 1.0 | 1.4 | 0.05 | 1.5 | 50 | 6.5 | 1.0 | 0.79 | 0.052 | 1.42 | 1.35 | 0.29 | 0.25 |
| 9 | 1.0 | 1.4 | 0.05 | 1.5 | 50 | 2 | 1.0 | 0.79 | 0.048 | 1.45 | 1.51 | 0.42 | 0.37 |
| 10 | 1.0 | 1.4 | 0.05 | 1.5 | 50 | 4 | 1.0 | 0.90 | 0.050 | 1.45 | 1.78 | 0.56 | 0.34 |

EXAMPLE 4

Synthesis of layered silicate Product Nos. 11–16 was carried out as in Example 3. Except for the reaction mixture containing product No. 12, the layered silicate-containing reaction mixtures were incorporated directly in detergent formulations as suspensions without separating the mother liquor. The reaction mixture containing product No. 12 was dried and, sodium alkylbenzene sulfonate (ABS) was added thereto in order to improve its dispersibility before incorporation in the detergent formulation. Analysis of product No. 12 revealed the following composition:
  53.1% by weight layered silicate;
  44.2% by weight $Na_2SO_4$;
  3.8% by weight ABS.

Table 3 shows the compositions of the reaction mixtures for product Nos. 11–16 and the conditions under which the reaction mixtures were processed.

EXAMPLE 5

The synthesis of layered silicate product No. 17 again was carried out as in Example 3. The molar ratios in the reaction mixture and also the reaction conditions correspond to those used for the synthesis of layered silicate product No. 8 reported in Table 2. The reaction mixture was dried without separation of the mother liquor and the recovered solids were incorporated in detergent formulations.

TABLE 3

| Layered Silicate Product No. | Molar Ratio in the Reaction Mixture | | | | | Reaction Conditions | | |
|---|---|---|---|---|---|---|---|---|
| | MgO | Na$_2$O | Al$_2$O$_3$ | SiO$_2$ | H$_2$O | T (°C.) | (hr) | pH |
| 11 | 1.0 | 1.4 | 0.05 | 1.5 | 50 | 180 | 4 | 12.9 |
| 12 | 1.0 | 1.4 | 0.05 | 1.4 | 50 | 180 | 4 | 12.7 |
| 13 | 1.0 | 1.4 | 0.05 | 1.5 | 50 | 180 | 6.5 | 12.9 |
| 14 | 1.0 | 1.4 | 0.05 | 1.5 | 50 | 180 | 6.5 | 12.9 |
| 15 | 1.0 | 1.35 | 0.05 | 1.5 | 50 | 180 | 6.5 | 12.7 |
| 16 | 1.0 | 1.3 | 0.05 | 1.5 | 50 | 180 | 6.5 | 12.6 |

EXAMPLE 6

The synthesis of lithium-containing layered silicate product No. 18 was carried out using the method described in Example 1. Instead of hydrargillite, however, lithium carbonate was added to the reaction suspension. The molar ratio in the reaction mixture and the molar ratio of the layered silicate product after washing and drying are shown in the following Table 4.

TABLE 4

| Molar Ratios: | MgO | Na$_2$O | Li$_2$O | SiO$_2$ | H$_2$O |
|---|---|---|---|---|---|
| in the reaction mixture: | 1.0 | 1.2 | 0.04 | 1.5 | 100 |
| after washing and drying: | 1.0 | 0.15 | 0.03 | 1.49 | 1.0 |

EXAMPLE 7

In a stirrer-equipped autoclave, 37 kg of magnesium sulfate heptahydrate were dissolved at 70° C. in approximately 50 liters of deionized water. A mixture consisting of 50.4 kg of a waterglass solution containing 27 g SiO$_2$ and 8 g Na$_2$O in 100 g water, 23.2 kg of a 50% sodium hydroxide solution and approximately 23 kg of deionized water was then added with vigorous stirring, resulting in the formation of an initially thick suspension. Lastly, 1.2 kg hydrargillite containing 63% Al$_2$O$_3$ were added. The suspension was heated to 180° C. with continued stirring and was kept at that temperature for 6 hours. The suspension was cooled and its solids content then was adjusted to about 40% by weight by evaporation of water. The product was then dried by spraying with hot air, resulting in the formation of a loose powder.

Analysis of layered silicate product No. 19 revealed the following:

| Powder density | 555 g/liter |
|---|---|
| Ignition loss (800° C.; 1 hour) | 12.2% |
| Whiteness (Berger) | 104 |
| Sieve analysis | on 1.6 mm: 0% |
| | on 0.8 mm: 0% |
| | on 0.4 mm: 2% |
| | on 0.2 mm: 60% |
| | on 0.1 mm: 37% |
| | through 0.1 mm: 1% |

Analysis of a sample of layered silicate product No. 19, washed free from sodium sulfate and then dried, revealed the following composition (in % by weight): MgO: 25.5%; Na$_2$O: 6.2%; Al$_2$O$_3$: 3.2%; SiO$_2$: 51.8%; H$_2$O: 13.3%

The X-ray diffraction pattern of layered silicate product No. 19 shows the reflections characteristic of smectites.

EXAMPLE 8

Measurements were carried out to determine the ion exchange capacity and swelling behavior of some of the layered silicates described above and of some commercially available natural layered silicates. Swelling behavior measurements carried out, for example, using quaternary ammonium compounds were intended to determine whether surfactants are incorporated in the layered silicates. The standard used was the widening of the layer interval produced by the incorporation of cetyldimethyl benzylammonium ions. Aqueous suspensions (5% by weight solids) of the layered silicates were prepared. The suspensions were heated to 60° C. and a 35% solution of cetyldimethyl benzylammonium chloride was added with vigorous stirring. Based on 100 g of air-dried layered silicate, 0.12 mole of the quaternary ammonium compound was added to the suspension, followed by stirring for 30 minutes at 60° C. The layered silicate was recovered by filtration, washed free from sulfate with hot water and then dried at 75° C. Layer intervals were determined by radiographic methods. The results are presented in Table 5, hereinbelow.

TABLE 5

| Layered Silicate Product No. | Ion Exchange Capacity (meq/100 g) | Layer Interval after Incorporation (nm) |
|---|---|---|
| 1 | 67 | |
| 5 | 57 | |
| 6 | 100 | <2.0 |
| 7 | 67 | no widening in |
| 8 | 67 | relation to the |
| 9 | 75 | Na form |
| 10 | 54 | |
| 19 | 52 | |
| Bentonites: | | |
| Dis-Thix-Extra[1] | 82 | 3.62 |
| Bentonite T[2] | 65 | 3.47 |
| Active Bentonite B[3] | 65 | — |
| Bentonite A[3] | 65 | — |

[1]Schwegmann, Bonn
[2]Sud-Chemie, Munich
[3]Erbslöh, Geisenheim, Rhine

EXAMPLE 9

To determine their gel-forming properties, layered silicates washed free from sulfate were dispersed in tapwater having a hardness of 16°dH (dH=German Hardness). Gel formation was determined after 2 hours by viscosity measurements carried out on homogeneous, non-sedimented samples. The viscosity measurements were carried out at 20° C. with a Brookfield viscosimeter using a Helipath stand at 60 revolutions per minute. The results are presented in Table 6, hereinbelow.

TABLE 6

| Layered Silicate Product No. | Layered Silicate Content in the Gel (% by weight) | Viscosity (mPa · s) |
|---|---|---|
| 1 | | |
| 5 | | |
| 6 | | |
| 7 | 10 | No gel formation |
| 8 | | |
| 9 | | |
| 10 | | |
| 18 | | |
| Laponite RD[1] | 10 | Solid gel |
| Laponite RD[1] | 2 | 40,000 |
| Bentonites: | | |
| Dis-Thix-Extra[2] | 10 | 50,000 |
| Bentonite T[3] | 10 | 8,800 |

[1]Laporte Ind., London
[2]Schwegmann, Bonn
[3]Sud-Chemie, Munich

EXAMPLE 10

A phosphate-free, zeolite-containing laundry detergent was prepared from the following components ("EO" designates ethylene oxide units):

| | |
|---|---|
| Sodium alkylbenzene sulfonate | 9.0% |
| tallow fatty alcohol + 14 EO | 2.0% |
| tallow fatty alcohol + 5 EO | 2.0% |
| hardened fish oil/hardened rape oil (50:50)-fatty acid, Na salt | 3.4% |
| waterglass | 2.5% |
| zeolite 4A | 35.0% |
| sodium sulfate | 13.4% |
| sodium perborate | 20.0% |

Quantities of 10% by weight of layered silicate, based on the total weight of the detergent, were added.

The washing tests with the detergents were carried out on cotton fabrics in a model washing machine. The detergent dosage was 7.5 g/l. To measure incrustation, 25 washings were carried out at a washing temperature of 90° C. in water having a hardness of 16°dH (Ca:Mg molar ratio of 5:1) using a laundry-to-wash liquor weight ratio of 1:20. Incrustation was determined by incinerating the fabrics and weighing the residual ash. The weights of residual ash, as a percent of the weight of the original fabric, are presented in Table 7. The addition of layered silicates reduces incrustation formation after 25 washes, with the layered silicates of the present invention producing particularly favorable effects.

Products Nos. 8 and 18 of the present invention are incorporated in this and in the following formulations in Na$_2$SO$_4$-free, dry form.

TABLE 7

| Incrustation after 25 washes | | |
|---|---|---|
| Additive | | |
| Amount | Type | Ash (%) |
| — | — | 4.8 |
| 10% | synthenic hectorite Laponite RD[1] | 3.8 |
| 10% | natural bentonite Dis-Thix-Extra[2] | 3.8 |
| 10% | product No. 8 of the invention | 3.1 |

TABLE 7-continued

| Incrustation after 25 washes | | |
|---|---|---|
| Additive | | |
| Amount | Type | Ash (%) |
| 10% | product No. 18 of the invention | 3.1 |

[1]Laporte Ind., London
[2]Schwegmann, Bonn

EXAMPLE 11

Detergents 11-1 and 11-2 were prepared from the following components:

| Component | Wt. % of Component in Detergent 11-1 | Wt. % of Component in Detergent 11-2 |
|---|---|---|
| Na—alkylbenzene sulfonate | 4.0 | 4.0 |
| Na—tallow fatty alcohol sulfate | 4.0 | 4.0 |
| C$_{16}$-C$_{22}$ fatty acid, Na salt | 0.8 | 0.8 |
| Tallow fatty alcohol + 5 EO | 0.8 | 0.8 |
| C$_{14}$-C$_{15}$ oxoalcohol + 7 EO | 3.6 | 3.6 |
| Zeolite 4A | 25.0 | 25.0 |
| Laponite RD | 10.0 | — |
| Layered silicate Product No. 8 of the invention | — | 10.0 |
| Sodium silicate | 2.75 | 2.75 |
| Magnesium silicate | 0.7 | 0.7 |
| Sodium HEDP* | 0.8 | 0.8 |
| Sodium carbonate | 4.0 | 4.0 |
| Carboxymethyl/methylcellulose | 0.8 | 0.8 |
| Sodium perborate tetrahydrate | 23.5 | 23.5 |
| Paraffin foam inhibitor | + | + |
| Enzyme | + | + |
| Water/salts | remainder | remainder |

*Hydroxyethane-1,1-diphosphonic acid

Using these detergents, washing was carried out under the following conditions:
(a) Siemens Siwamat 570 domestic washing machine
(b) Wash cycle: 2-liquor boil-wash program (90° C.)
(c) Wash load: 3.5 kg, including test fabric
(d) Test fabric: one cotton skein (15 g) soiled with dust/sebum
(e) Water hardness: 16°dH tap water
(f) detergent: 2 doses, 125 g per dose
(g) 25 washing/drying cycles The ash contents in % of co-washed bleached cotton fabrics after 5 and 25 washes are shown in the following Table 8:

TABLE 8

| No. of wash cycles | % Ash in Detergent 11-1 | % Ash in Detergent 11-2 |
|---|---|---|
| 5 | 0.6 | 0.3 |
| 25 | 1.8 | 0.6 |

Detergent 11-2 containing a layered silicate of the present invention produces distinctly lower ash contents than detergent 11-1 containing Laponite RD.

The remission values on co-washed terry cloth show a distinctly lower redeposition tendency for detergent 11-2:

| Detergent: | 11-1 | 11-2 |
|---|---|---|
| % R (terry cloth) After 25 washes: | 77.7 | 81.3 |

EXAMPLE 12

Primary detergency tests were carried out in a Launderometer under the following conditions:

|  | Concentration |
|---|---|
| Detergent Formulation | |
| Zeolite 4A | 2.0 g/l |
| Layered silicate | 1.0 g/l |
| Surfactant (Na—alkylbenzene sulfonate or $C_{12}$–$C_{18}$ fatty alcohol + 5 EO) | 0.5 g/l |
| Washing Conditions | |
| Temperature: | 90° C. |
| Washing time: | 30 minutes |
| Water hardness: | 16° dH (Ca:Mg = 5:1) |
| Soil: | dust and sebum on refined polyester cotton fabric |

Detergency was determined by measurement of the remission values after washing. The results of the tests are shown in Table 9. The symbol "Δ" represents the difference between (i) the remission value of a test fabric washed in the presence of the layered silicates and (ii) the remission value of a test fabric washed in the absence of the layered silicates. It can be seen that layered silicate product Nos. 8 and 18 of the present invention provide distinctly improved remission values, especially in the presence of nonionic surfactants.

TABLE 9

Primary detergency in the presence of layered silicates Δ = remission (with addition of layered silicate) − remission (without layered silicate)

| | Remission values Δ (% R) | |
|---|---|---|
| Layered silicate | Na alkylbenzene sulfonate | $C_{12}$–$C_{18}$ fatty alcohol + 5 EO |
| Synthetic hectorite Laponite RD | +11.9 | −9.7 |
| Natural bentonite Bentonite T | +3.3 | −7.3 |
| Layered silicate Product No. 18 of the invention | +12.4 | −2.5 |
| Layered silicate Product No. 8 of the invention | +12.2 | −1.1 |

EXAMPLE 13

Primary detergency tests were carried out in a Launderometer under the following conditions:

|  | Concentration |
|---|---|
| Detergent Formulation | |
| Zeolite 4A | 2.0 g/l |
| Layered silicate, based on active substance | 1.0 g/l |
| Surfactant ($C_{12}$–$C_{18}$ fatty alcohol + 5 EO or $C_{14}$–$C_{15}$ oxoalcohol + 7 EO) | 0.5 g/l |
| Washing Conditions | |
| Temperature: | 60° C. |
| Washing time: | 30 minutes |
| Water hardness: | 16° dH (Ca:Mg = 5:1) |
| Soil: | dust/sebum on cotton (hereinafter "DS-C") |
|  | dust/sebum on refined cotton (hereinafter "DS-CR") |
|  | dust/sebum on refined polyester cotton (hereinafter "DS-PCR") |
|  | dust/wool grease on cotton (hereinafter "DWG-C") |

The layered silicates of the present invention in the form of aqueous suspensions, had the following composition:

| Product No. 11: | 14.8% by eight layered silicate; 12.3% by weight $Na_2SO_4$ |
|---|---|
| Product No. 13: | 12.2% by weight layered silicate; 10.2% by weight $Na_2SO_4$ |

Detergency was determined by measurement of the remission values after washing. The results of the tests are shown in Table 10. The symbol "Δ" represents the difference between (i) the remission value of a test fabric washed in the presence of the layered silicates and (ii) the remission value of a test fabric washed without the layered silicates. In the presence of the two nonionic surfactants, improved cleaning effect of the layered silicates of the invention on different soils is clearly apparent.

TABLE 10

Primary detergency in the presence of layered silicates
Δ = remission (with addition of layered silicate) − remission (without layered silicates)

| Layered silicate | Surfactant | Remission values Δ (% R) | | | |
|---|---|---|---|---|---|
| | | DS-C | DS-CR | DS-PCR | DWG-C |
| Synthetic hectorite Laponite RD | $C_{12}$–$C_{18}$ fatty alcohol + 5 EO | −10.8 | −10.9 | −5.0 | −7.7 |
| Natural bentonite Bentonite T | | −3.8 | −1.9 | +6.6 | −0.9 |
| Layered silicate Product No. 8 of the invention | | +1.0 | +0.9 | +7.2 | +1.2 |
| Layered silicate Product No. 11 of the invention | | +2.3 | +3.7 | +6.6 | +3.6 |
| Layered silicate Product No. 12 of the invention | | +1.7 | −0.1 | +4.6 | +1.2 |
| Layered silicate Product No. 13 of the invention | | +2.3 | +5.2 | +6.0 | +3.4 |
| Synthetic hectorite Laponite RD | $C_{14}$–$C_{15}$ oxoalcohol + 7 EO | −0.1 | −6.7 | −8.4 | −7.0 |
| Natural bentonite Bentonite T | | +2.9 | −2.3 | +0.9 | −0.8 |
| Layered silicate Product No. 8 of the invention | | +4.0 | +2.8 | +3.5 | +1.8 |
| Layered silicate Product No. 11 of the invention | | +3.7 | +9.3 | +7.2 | +4.0 |
| Layered silicate Product No. 12 of the invention | | +3.7 | +3.4 | +4.9 | +0.4 |
| Layered silicate Product No. 13 | | +2.8 | +8.2 | +6.4 | +2.1 |

TABLE 10-continued

Primary detergency in the presence of layered silicates
Δ = remission (with addition of layered silicate) − remission (without layered silicates)

| Layered silicate of the invention | Surfactant | Remission values Δ (96 R) | | | |
|---|---|---|---|---|---|
| | | DS-C | DS-CR | DS-PCR | DWG-C |

EXAMPLE 14

Detergents 14-1, 14-2, 14-3, 14-4 and 14-5 were prepared from the following components:

| Component | Weight % of Component in Detergent | | | | |
|---|---|---|---|---|---|
| | 14-1 | 14-2 | 14-3 | 14-4 | 14-5 |
| Sodium alkylbenzene sulfonate | 8.0 | 8.0 | 8.0 | 8.0 | 8.0 |
| Tallow fatty alcohol + 5 EO | 2.4 | 2.4 | 2.4 | 2.4 | 2.4 |
| Tallow fatty alcohol + 14 EO | 0.5 | 0.5 | 0.5 | 0.5 | 0.5 |
| Oleyl-cetyl alcohol + 5.9 EO | 1.5 | 1.5 | 1.5 | 1.5 | 1.5 |
| $C_{12}$–$C_{22}$ fatty acid, Na salt | 0.8 | 0.8 | 0.8 | 0.8 | 0.8 |
| Zeolite 4A | 25.0 | 25.0 | 25.0 | 25.0 | 25.0 |
| Layered silicate Product No. 8 of the invention | — | 10.0 | — | — | — |
| Layered silicate Product No. 17[1] | — | — | 10.0[2] | — | — |
| Laponite RD | — | — | — | 10.0 | — |
| Dis-Thix-Extra | — | — | — | — | 10.0 |
| Sodium silicate | 3.0 | 3.0 | 3.0 | 3.0 | 3.0 |
| Sodium carbonate | 5.0 | 5.0 | 5.0 | 5.0 | 5.0 |
| Carboxymethyl/methyl cellulose | 0.8 | 0.8 | 0.8 | 0.8 | 0.8 |
| Sodium perborate tetrahydrate | 22.5 | 22.5 | 22.5 | 22.5 | 22.5 |
| Silicone foam inhibitor | + | + | + | + | + |
| Sodium sulfate | 21.0 | 11.0 | 11.0[3] | 11.0 | 11.0 |
| Water/salts | rest | rest | rest | rest | rest |

[1]Layered silicate product No. 17 is used in the form of a dried suspension containing 50% by weight layered silicate and 50% by weight $Na_2SO_4$
[2]Based on active substance.
[3]10% by weight are introduced into the detergent formulation by the layered silicate.

Bleached cotton fabrics were washed 25 times with these detergents under the following conditions:
 (a) Washing apparatus: Launderometer (10 steel balls)
 (b) Laundry-to-wash liquor weight ratio: 1:12 (8.4 g fabric/100 ml)
 (c) Washing time: 30 minutes, including heating to 90° C.
 (d) Water hardness: 21°dH (Ca:Mg=5:1) in the wash cycle
 (e) Water hardness: 16°dH (Ca:Mg=5:1) in the four rinse cycles
 (f) Detergent concentration: 7 g/liter After 25 wash/rinse cycles, the fabrics were incinerated in order to measure incrustation. The residual ash was weighed and and computed as a percentage of the weight of the original fabric. The % Ash computation for detergents 14-1 through 14-5 are presented hereinbelow:

| Detergent: | 14-1 | 14-2 | 14-3 | 14-4 | 14-5 |
|---|---|---|---|---|---|
| % Ash: | 1.7 | 0.8 | 0.8 | 1.3 | 1.1 |

Detergents 14-2 and 14-3 containing a layered silicate of the present invention exhibit a marked reduction in incrustation.

EXAMPLE 15

Detergents 15-1, 15-2, 15-3 and 15-4 were prepared from the following components:

| Component | Weight % of Component in Detergent | | | |
|---|---|---|---|---|
| | 15-1 | 15-2 | 15-3 | 15-4 |
| Sodium alkylbenzene sulfonate | 8.0 | 8.0 | 8.0 | 8.0 |
| Tallow fatty alcohol + 5 EO | 2.4 | 2.4 | 2.4 | 2.4 |
| Tallow fatty alcohol + 14 EO | 0.5 | 0.5 | 0.5 | 0.5 |
| Oleyl-cetyl alcohol + 5.9 EO | 1.5 | 1.5 | 1.5 | 1.5 |
| $C_{16}$–$C_{22}$ fatty acid sodium salt | 0.8 | 0.8 | 0.8 | 0.8 |
| Zeolite 4A | 25.0 | 25.0 | 25.0 | 25.0 |
| Layered silicate Product No. 8 of the invention | — | 10.0 | — | 10.0 |
| Sokalan CP5[1] | 2.0 | 2.0 | — | — |
| Sodium EDTMP[2] | — | — | 0.5 | 0.5 |
| Sodium silicate | 3.0 | 3.0 | 3.0 | 3.0 |
| Sodium carbonate | 5.0 | 5.0 | 5.0 | 5.0 |
| Carboxymethyl/methyl cellulose | 0.8 | 0.8 | 0.8 | 0.8 |
| Sodium perborate tetrahydrate | 22.5 | 22.5 | 22.5 | 22.5 |
| Silicone foam inhibitor | + | + | + | + |
| Sodium sulfate | 13.0 | 3.0 | 14.5 | 4.5 |
| Water/salts | rest | rest | rest | rest |

[1]A product of BASF, Ludwigshafen: sodium salt of a maleic-acid-modified polyacrylic acid.
[2]Ethylene diamine tetramethylene phosphonic acid.

Bleached cotton fabrics were washed 25 times with these detergents in a Launderometer under the conditions described in Example 14 and then incinerated to measure incrustation. The % Ash computations are presented hereinbelow:

| Detergent: | 15-1 | 15-2 | 15-3 | 15-4 |
|---|---|---|---|---|
| % Ash: | 1.9 | 0.8 | 1.6 | 0.5 |

As detergents 15-2 and 15-4 show, the layered silicate product No. 8 of the present invention is effective in inhibiting incrustation, even in the presence of additional co-builders such as polycarboxylate or phosphonate.

EXAMPLE 16

Phosphate-containing detergents 16-1, 16-2, 16-3 and 16-4 were prepared from the following components:

| Component | Weight % of Component in Detergent | | | |
|---|---|---|---|---|
| | 16-1 | 16-2 | 16-3 | 16-4 |
| Sodium alkylbenzene sulfonate | 8.0 | 8.0 | 8.0 | 8.0 |
| Tallow fatty alcohol + 5 EO | 2.4 | 2.4 | 2.4 | 2.4 |
| Tallow fatty alcohol + 14 EO | 0.5 | 0.5 | 0.5 | 0.5 |
| Oleyl-cetyl alcohol + 5.9 EO | 1.5 | 1.5 | 1.5 | 1.5 |
| $C_{16}$–$C_{22}$ fatty acid, sodium salt | 0.8 | 0.8 | 0.8 | 0.8 |
| Layered silicate Product No. 8 of the invention | — | 15.0 | — | — |
| Laponite RD | — | — | 15.0 | — |
| Dis-Thix-Extra | — | — | — | 15.0 |
| Sodium tripolyphosphate | 24.0 | 24.0 | 24.0 | 24.0 |
| Sodium silicate | 3.0 | 3.0 | 3.0 | 3.0 |
| Sodium perborate tetrahydrate | 22.5 | 22.5 | 22.5 | 22.5 |
| Carboxymethyl/methyl cellulose | 0.8 | 0.8 | 0.8 | 0.8 |
| Silicone foam inhibitor | + | + | + | + |
| Sodium sulfate | 21.0 | 6.0 | 6.0 | 6.0 |

| Component | Weight % of Component in Detergent | | | |
|---|---|---|---|---|
| | 16-1 | 16-2 | 16-3 | 16-4 |
| Water | rest | rest | rest | rest |

The primary detergency of these detergents was determined under the following conditions:
 (a) Washing apparatus: Launderometer (10 steel balls)
 (b) Laundry-to-wash liquor weight ratio: 1:12 (8.4 g fabric/100 ml)
 (c) Washing time: 30 minutes, including heating to 90° C.
 (d) Water hardness: 16dH (Ca:Mg=5:1)
 (e) Detergent concentration: 7 g/liter Detergent 16-2 containing the layered silicate product No. 8 of the invention has clearly superior cleaning ability compared with detergents 16-3 and 16-4, for example, as shown by the remission measurements presented in Table 11 hereinbelow:

TABLE 11

| Soil Type | % Remission | | | | LSD-value (95% certainty) |
|---|---|---|---|---|---|
| | 16-1 | 16-2 | 16-3 | 16-4 | |
| DS-PCR | 63.7 | 63.7 | 57.0 | 60.3 | 0.5 |
| DS-CR | 46.2 | 49.0 | 43.5 | 43.6 | 0.8 |
| Red wine on cotton | 69.4 | 70.5 | 69.2 | 69.4 | 0.3 |

Incrustation after 25 washes using detergents 16-1, 16-2, 16-3 and 16-4 was investigated under the following conditions:
 (a) Washing apparatus: 800 ml glass beaker
 (b) Laundry-to-wash liquor weight ratio: 1:10 (cotton skeins, bleached cotton fabric)
 (c) Water hardness: 21° dH (Ca:Mg=5:1)
 (d) Washing time and temperature: 15 mins. at 95° C.
 (e) Detergent concentration: 7 g/liter
 (f) Cycle: 3 rinses after each wash
 (g) No. of wash/rinse cycles: 25

Determination of the ash contents (bleached cotton fabric) after 25 washes produced the following results:

| Detergent: | 16-1 | 16-2 | 16-3 | 16-4 |
|---|---|---|---|---|
| % Ash: | 7.7 | 5.6 | 6.5 | 7.2 |

Accordingly, detergent 16-2 containing the layered silicate product No. 8 of the present invention shows the most favorable effect on incrustation inhibition.

EXAMPLE 17

Phosphate-free detergents 17-1, 17-2, 17-3 and 17-4 were prepared from the following components:

| Component | Weight % of Component in Detergent | | | |
|---|---|---|---|---|
| | 17-1 | 17-2 | 17-3 | 17-4 |
| Sodium alkylbenzene sulfonate | 8.0 | 8.0 | 8.0 | 8.0 |
| Tallow fatty alcohol + 5 EO | 2.4 | 2.4 | 2.4 | 2.4 |
| Tallow fatty alcohol + 14 EO | 0.5 | 0.5 | 0.5 | 0.5 |
| Oleyl-cetyl alcohol + 5.9 EO | 1.5 | 1.5 | 1.5 | 1.5 |
| $C_{16}$–$C_{22}$ fatty acid, Na salt | 0.8 | 0.8 | 0.8 | 0.8 |
| Zeolite 4A | 25.0 | 25.0 | 25.0 | 25.0 |
| Layered silicate Product No. 19 of the invention | — | 10.0[1] | — | — |
| Active Bentonite B[2] | — | — | 10.0 | — |
| Bentonite A[2] | — | — | — | 10.0 |
| Sodium silicate | 3.0 | 3.0 | 3.0 | 3.0 |
| Sodium carbonate | 5.0 | 5.0 | 5.0 | 5.0 |
| Carboxymethyl/methyl cellulose | 0.8 | 0.8 | 0.8 | 0.8 |
| Sodium perborate tetrahydrate | 22.5 | 22.5 | 22.5 | 22.5 |
| Silicone foam inhibitor | + | + | + | + |
| Sodium sulfate | 21.0 | 11.0 | 11.0 | 11.0 |
| Water/salts | rest | rest | rest | rest |

[1]Based on active substance
[2]Products of Erbslöh, D-6222 Geisenheim/Rhine

Using these detergents, washing was carried out under the conditions described in Example 14 and the percent ash subsequently determined. The detergent concentration was 6 g/liter.

| Detergent: | Fabric ash: | | | |
|---|---|---|---|---|
| | 17-1 | 17-2 | 17-3 | 17-4 |
| % Ash After 25 washes: | 3.4 | 1.0 | 2.6 | 2.6 |

Despite the lower dosage in comparison with the dosage in Example 14, detergent 17-2 was considerably more effective in inhibiting incrustation in comparison with the other detergents.

Although the present invention has been described in terms of a number of specific examples and embodiments thereof, it will be appreciated by those skilled in the art that a wide variety of equivalents may be substituted for the specific parts and steps of operation described herein, all without departing from the spirit and scope of the present invention, as defined in the appended claims.

What is claimed is:

1. A synthetic, finely-divided, water-insoluble layered silicate having a mixed crystal system including a smectite-like crystal phase which is irregularly permeated by crystalline sodium polysilicate, and the following oxide summation formula

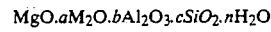

$$MgO.aM_2O.bAl_2O_3.cSiO_2.nH_2O$$

wherein M is selected from the group consisting of sodium, and a mixture of sodium and lithium, said mixture having a molar ratio of Na to Li of at least about 2, n representing the number of water molecules bound in the crystal phase and a, b, c and n each represent a number having a value within the following ranges:
 a is from about 0.05 to about 0.4;
 b is from 0 to about 0.3;
 c is from about 1.2 to about 2.0;
 n is from about 0.3 to about 3.0,
said layered silicate having a swelling power ($V_s/V$) of less than about 0.6 as determined by the quotient of the sediment volume ($V_s$) to the total volume (V) of said layered silicate in aqueous suspension.

2. The synthetic layered silicate of claim 1, wherein a, b and c have a value within the following ranges:
 a is from about 0.15 to about 0.30;
 b is from 0 to about 0.10;
 c is from about 1.3 to about 1.5.

3. The synthetic layered silicate of claim 1 wherein the ratio of a to b is equal to or greater than about 3.

4. The synthetic layered silicate of claim 1 wherein the ratio of a to b is equal to or greater than about 4.

5. The synthetic layered silicate of claim 1 having a swelling power ($V_s/V$) of less than about 0.4.

6. The synthetic layered silicate of claim 1 wherein the silicate comprises a mixed crystal system composed of a structure-determining saponite- and/or hectorite-like crystal phase which is irregularly permeated by said crystalline sodium polysilicate.

7. The synthetic layered silicate of claim 1 wherein the silicate contains an alkaline agent selected from the group consisting of (i) an alkali not bound in the crystal structure of the layered silicate and (ii) water-soluble alkali metal salts.

8. The synthetic layered silicate of claim 1 wherein the silicate contains sodium hydroxide not bound in the crystal structure of the layered silicate.

9. The synthetic layered silicate of claim 1 wherein the silicate contains water-soluble alkali metal salts selected from the group consisting of alkali metal sulfates, alkali metal carbonates, and mixtures thereof.

10. A synthetic, finely-divided, water-insoluble layered silicate comprising a mixed crystal system corresponding to the following structural formula $$[Na_{x+y}(Mg_{3-x}Li_x)(Si_{4-y}Al_y)O_{10}(OH)_2] \cdot m[Na_2Si_zO_{2z+1}] \cdot nH_2O$$

x is from 0 to about 0.3;
y is from 0 to about 0.5;
x+y is from about 0.1 to about 0.5;
z is from about 1.0 to about 22;
m is from about 0.1 to about 0.5, and
n is from 0 to about 8.

11. The synthetic layered silicate of claim 10, wherein
x is from 0 to about 0.1;
y is from 0 to about 0.4;
x+y is from about 0.2 to about 0.4;
z is from about 1.0 to about 14;
m is from about 0.1 to about 0.3, and
n is from about 2 to about 6.

12. The synthetic layered silicate of claim 10 wherein the molar ratio of sodium to lithium is at least about 2.

13. A process for producing a synthetic, finely-divided, water-insoluble layered silicate having a mixed crystal system including a smectite-like crystal phase which is irregularly permeated by crystalline sodium polysilicate, and the following oxide summation formula $$MgO \cdot aM_2O \cdot bAl_2O_3 \cdot cSiO_2 \cdot nH_2O$$

wherein M is selected from the group consisting of sodium, and a mixture of sodium and lithium, said mixture having a molar ratio of Na to Li of at least about 2, n representing the number of water molecules bound in the crystal phase and a, b, c and n each represent a number having a value within the following ranges:
a is from about 0.05 to about 0.4;
b is from 0 to about 0.3;
c is from about 1.2 to about 2.0;
n is from about 0.3 to about 3.0,
comprising hydrothermally reacting water-soluble sodium silicate with an oxide, hydroxide, or water-soluble salt of magnesium, aluminum and/or lithium.

14. The process of claim 13, wherein said compounds are hydrothermally reacted in an aqueous medium over a period of about 1 to about 20 hours at a reaction temperature of about 150° to about 250° C. within a sealed reaction vessel under an equilibrium vapor pressure corresponding to the reaction temperature.

15. The process of claim 13, wherein said compounds are hydrothermally reacted in the presence of an excess of an alkali metal salt.

16. The process of claim 13, wherein said compounds are hydrothermally reacted in the presence of an excess of sodium hydroxide and/or soda.

17. The process of claim 13, wherein said compounds are intensively stirred during the hydrothermal reaction.

18. The process of claim 13, wherein said compounds are hydrothermally reacted in an aqueous medium over a period of from about 2 to about 8 hours at a temperature of from about 170° C. to about 200° C.

19. The process of claim 13, wherein said compounds are hydrothermally reacted in an aqueous medium over a period of from about 4 to about 6 hours at a temperature of from about 170° C. to about 190° C.

20. The process of claim 13, wherein from about 50 to about 100 moles of H$_2$O, based on the water-free oxide formula $$MgO \cdot aM_2O \cdot bAl_2O_3 \cdot cSiO_2$$

in which M, a, b and c are as defined in claim 13, are used during the hydrothermal reaction to prepare a reaction product of low water content which may be further processed without separating the layered silicate from the mother liquor.

21. The process of claim 13, including recovering said layered silicate by separating the layered silicate from the mother liquor.

22. The process of claim 13, including recovering said layered silicate by separating the layered silicate from the mother liquor and washing the layered silicate.

23. The process of claim 13, including recovering said layered silicate as an aqueous suspension.

24. The process of claim 13, including separating said layered silicate from the mother liquor by filtration or centrifugation, and washing the layered silicate until it is substantially free from water-soluble components.

25. The process of claim 13, including hydrothermally reacting said compounds in the presence of NaOH and monitoring the pH of the mother liquor so that after preparing the layered silicate the pH of the mother liquor is at least about 12.

26. A detergent comprising from about 10 to about 35% by weight of a crystalline builder of the zeolite type, and at least about 5% by weight of a synthetic, finely-divided, water-insoluble layered silicate having a mixed crystal system including a smectite-like crystal phase which is irregularly permeated by crystalline sodium polysilicate, and the following oxide summation formula $$MgO \cdot aM_2O \cdot bAl_2O_3 \cdot cSiO_2 \cdot nH_2O$$

wherein M is selected from the group consisting of sodium, and a mixture of sodium and lithium, said mixture having a molar ratio of Na to Li of at least about 2, n representing the number of water molecules bound in the crystal phase and a, b, c and n each represent a number having a value within the following ranges:
a is from about 0.05 to about 0.4;
b is from 0 to about 0.3;
c is from about 1.2 to about 2.0;
n is from about 0.3 to about 3.0, said layered silicate having a swelling power ($V_s/V$) of less than about 0.6 as determined by the quotient of the sediment volume ($V_s$) to the total volume (V) of said layered silicate in aqueous suspension.

27. The detergent of claim 26, including a surfactant.

28. The detergent of claim 26, wherein the zeolite builder comprises zeolite NaA, and the synthetic layered silicate is present in a quantity of from about 5 to about 30% by weight of the total weight of the detergent.

29. The detergent of claim 26, including a phosphate builder component.

30. The detergent of claim 26, including a bleaching agent.

31. The detergent of claim 26, including a water-soluble organic solvent.

32. The detergent of claim 26, including a builder capable of complexing calcium ions.

33. The detergent of claim 26, including finely-divided, synthetic sodium alumo-silicates.

34. The detergent of claim 26, including inorganic alkali metal salts selected from the group consisting of carbonates, bicarbonates, borates, sulfates, and silicates.

35. The detergent of claim 26, including a soil suspending agent.

36. The detergent of claim 26, including a compound which yields $H_2O_2$ in water, and a stabilizer for said compound.

37. The detergent of claim 26, including a compound which yields $H_2O_2$ in water, and an activator for said compound.

38. The detergent of claim 26, including an optical brightener for laundry fabrics.

39. A laundry detergent comprising:

(a) about 5 to about 30% by weight of a synthetic, finely divided, water-insoluble layered silicate having a mixed crystal system including a smectite-like crystal phase and a sodium polysilicate, and the following oxide summation formula $$MgO \cdot aM_2O \cdot bAl_2O_3 \cdot cSiO_2 \cdot nH_2O$$

wherein M is selected from the group consisting of sodium, and a mixture of sodium and lithium, said mixture having a molar ratio of Na to Li of at least about 2, n representing the number of water molecules bound in the crystal phase and a, b, c and n each represent a number having a value within the following ranges:

a is from about 0.05 to about 0.4;
b is from 0 to about 0.3;
c is from about 1.2 to about 2.0;
n is from about 0.3 to about 3.0,
said layered silicate having a swelling power ($V_sV$) of less than about 0.6 as determined by the quotient of the sediment volume ($V_s$) to the total volume (V) of said layered silicate in aqueous suspension;

(b) from about 5% to about 30% by weight of a surfactant;
(c) up to about 60% by weight of an alumosilicate;
(d) up to about 30% by weight of a phosphate;
(e) up to about 5% by weight of a complexing agent for calcium ions;
(f) up to about 50% by weight of a builder incapable of complexing calcium ions; and
(g) up to about 50% by weight of a bleaching agent and other additives generally present in a laundry detergent, all weights being based on the weight of said laundry detergent.

* * * * *